INVENTOR.
HENN H. SOONPAA
BY Harold D. Jastram
ATTORNEY

United States Patent Office 3,265,599
Patented August 9, 1966

3,265,599

FORMATION OF GRAIN BOUNDARY PHOTO-ORIENTER BY ELECTROLYTIC ETCHING

Henn H. Soonpaa, Minneapolis, Minn., assignor, by mesne assignments to Litton Systems, Inc., Beverly Hills, Calif., a corporation of Maryland

Filed June 25, 1963, Ser. No. 290,360
9 Claims. (Cl. 204—143)

Figure 1:
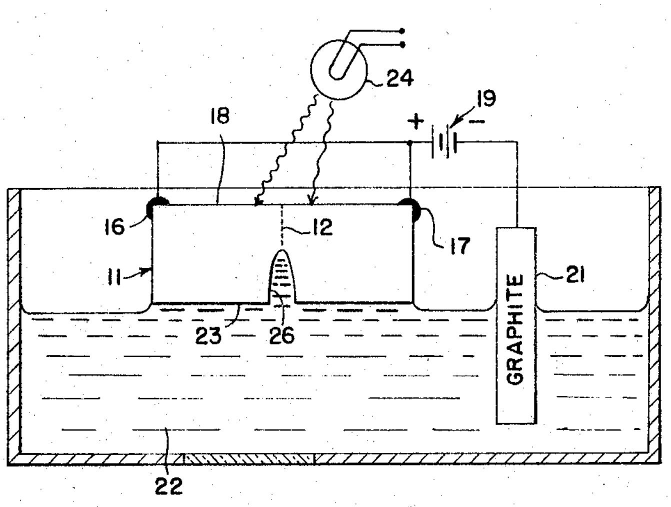

This invention relates to a process of etching a surface of a semiconductor cell and more particularly to a process for etching the surface of a semiconductor cell containing a grain boundary.

Semiconductors often must be etched in order to provide an efficient or useful physical surface for mechanical application of the cell to electrical circuits and the like. Often these mechanical or physical shapes must be symmetrical about a given point or grain boundary. These physical features may be machined into the surface of the semiconductor cell or ultrasonic cutting may be utilized to shape the semiconductor cell to the desired configuration. Such shaping or cutting presents problems of symmetry and accuracy of the location of the machining or cutting. Both of these methods of physically shaping the surface of a semiconductor must be followed by etching in order to remove strained material and flaws which might occur in a crystal. Particular problems might be encountered where the semiconductor is a homogeneous semiconductor cell such as N-type germanium containing a grain boundary in the cell. Machining a symmetrical surface along such a grain boundary is extremely difficult, if not impossible.

It is therefore an object of the present invention to provide a new and improved method of etching a semiconductor device.

It is further an object of the present invention to provide a new and improved method of etching a semiconductor cell having a grain boundary.

It is yet another object of the present invention to provide a new and improved method of symmetrically etching an N-type germanium semiconductor along a grain boundary therein.

It is a further object of the present invention to provide a new and improved method of etching a semiconductor material having a grain boundary therein by utilizing a light source to develop current carriers along a grain boundary and thereby symmetrically etch the semiconductor along the grain boundary.

In accordance with this invention, a sodium hydroxide solution is used as an etchant. A semiconductor cell containing a grain boundary is energized by a D.C. potential. A grain boundary, as herein used, is defined to mean the interface which occurs between two differently oriented single crystal grains in a bicrystal. The cell is energized by a source of D.C. potential and is placed in contact with the etchant. A light source is utilized to energize the grain boundary to facilitate etching along the grain boundary in contact with the etchant. The etching takes place in the neighborhood of the grain boundary.

In a further application, the cell which has been etched along the grain boundary is removed from the etchant and the other surface of the cell is placed in the etchant. The grain boundary is then energized by a D.C. potential which is of opposed polarity to the previously applied potential and the surface in contact with the etchant is energized by a light source. The etchant then removes material from the surface on either side of the grain boundary.

Figure 2:
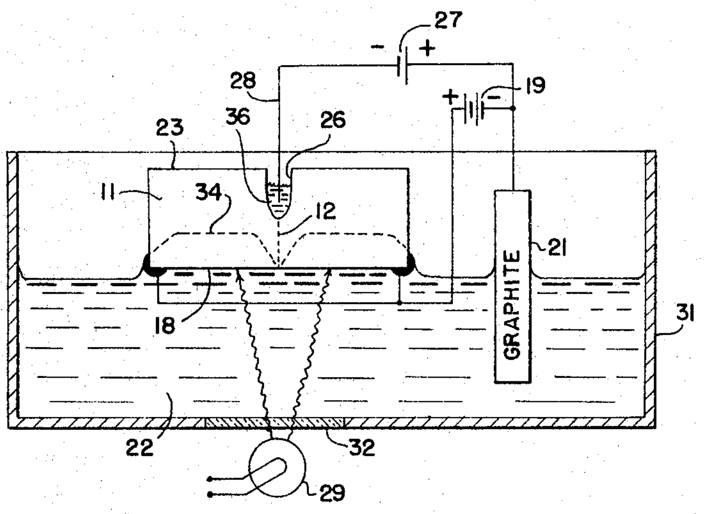
Figure 3:
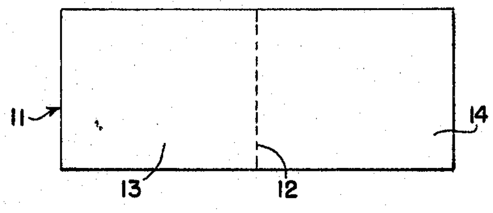
Figure 4:
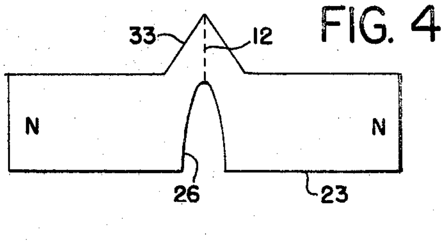

Other objects and advantages of this invention will become more fully apparent from the following detailed description when considered in view of the drawings in which:

FIGURE 1 is a schematic diagram of an etching bath wherein a cell is being etched along the grain boundary, FIGURE 2 is a further embodiment of the process wherein the cell has been reversed and the reverse side of the cell is etched, FIGURE 3 is a cross sectional view of a semiconductor cell containing a grain boundary, and FIGURE 4 is a cross sectional view of the cell shown in FIGURE 3 after it has been etched on both sides.

A semiconductor cell 11 which is to be etched is illustrated in FIGURE 3 of the drawings. The entire cell 11 is composed of a homogeneous semiconductive material such as, for instance, N-type germanium. The cell 11 might be silicon or other semiconductor materials and it may be of the P-type material. For the purposes of illustrating this invention however, the N-type germanium cell will be utilized in the discussion. The cell 11 contains a grain boundary 12. This grain boundary 12 is a dislocation between the monocrystalline structures on either side of the boundary. In other words, the portion 13 of the cell 11 is a monocrystalline structure or single crystal oriented along one axis whereas the portion 14 of the cell 11 is a monocrystalline structure of the same nature but oriented along a different axis. These different axes of orientation result in a dislocation at boundary 12 where the portion 13 and 14 of the cell meet. A grain boundary such as discussed here is noted in an article by Rolf K. Mueller titled Transient Response of Grain Boundaries and Its Application for a Novel-Light Sensor, printed in the Journal of Applied Physics, volume 30, No. 7, pages 1004 to 1010, and published July 1959.

In the preparation of the cell 11 for etching, a pair of ohmic contacts 16 and 17 are attached on the top surface 18 of the cell 11 and are connected to the cell 11 on either side of the grain boundary 12. These ohmic contacts provide a means for applying a D.C. voltage to the cell 11 in order to enhance etching of the cell 11 along the grain boundary 12. In the case where N-type germanium is utilized, a D.C. source 19 is connected to the contacts 16 and 17. The positive side of the D.C. source 19 is connected to these contacts and the negative side of the D.C. source is connected to a graphite electrode 21.

The graphite electrode 21 is submerged in an etchant bath 22. This etchant bath might be any electrolyte which can be utilized to etch N-type germanium and is preferably a hydroxide of an alkaline earth metal or alkali metal hydroxide. Examples of such hydroxides may be potassium hydroxide, calcium hydroxide, sodium hydroxide, and the like. For the purpose of illustrating this process, the etchant or electrolyte 22 is a 10 percent solution of sodium hydroxide in water.

With the D.C. source 19 connected to the contacts 16 and 17 and the electrode 21, the cell 11 is placed in the electrolyte 22 so that surface 23 is submerged. The cell 11 is then withdrawn so that only surface 23 contacts the electrolyte as a result of the surface tension of the electrolyte.

Next, a source of radiation 24 is positioned above the cell 11 so that radiation from the source 24 is cast upon the top surface 18 of the cell 11. This irradiating source increases the number of current carriers flowing at the boundary 12. These current carriers, in this case holes, flow along the boundary 12 and due to the fact that these holes represent positive charges, the material along the boundary 12 is more positive than the bulk of the cell 11. This positive material along the boundary 12 combines with the negative hydroxide radical thus resulting in an etching of the germanium along the grain boundary 12.

Any holes which are created by the irradiating energy source 24 which reached the boundary 12 are trapped at the boundary and thus provide a positive region similar to the P region in P-type germanium. The hydroxide radicals thus combine with the material along the boundary 12. A discussion of the photosensitivity of the grain boundary is also noted in the above referenced article. Since the etching process is dependent upon the existence of holes at the grain boundary 12, it is desirable that the maximum thickness of the cell 11 is greater than the hole diffusion lengths in the semiconductor. It is desirable that the thickness of the cell 11 be greater than the diffusion length in order that a maximum number of generated holes are trapped at the grain boundary 12, thus increasing the etching rate at the boundary. The rest of the cell-electrolyte interface at surface 23 does not have the holes necessary for etching to take place. The diffusion length is defined herein to mean the distance a hole will travel in the bulk semiconductor material before it will recombine with an electron.

When the groove 26 is deep enough, the cell 11 is removed from the electrolyte 22. If only a symmetrical groove 26 is desired in the cell 11, the process is complete, however, in the case where the cell 11 is to be etched along grain boundary 12 at the top surface 18, the cell 11 is now inverted and brought in contact with the electrolyte 22 in the same manner as previously described. Refer now to FIGURE 2 of the drawings. With the cell 11 in contact with the electrolyte, a D.C. voltage is applied to the grain boundary 12. A D.C. source 27 is connected to the grain boundary 12 so that the grain boundary 12 will have a voltage slightly different from that of the graphite electrode 21. In the case where N-type germanium is being utilized, the negative side of the D.C. source 27 is connected to the grain boundary 12 to make the grain boundary 12 slightly more negative than the graphite electrode 21.

An effective method of forming the contact at the grain boundary 12 is illustrated in FIGURE 2 wherein a liquid conductor such as silver paint is poured into the groove 26. The lead 28 from the source 27 is simply inserted into the liquid conductor thus effectuating a uniform and effective contact with the grain boundary 12. The other side of the D.C. source 27 is of course connected to the graphite electrode 21. The cell 11 is thus brought in contact with the electrolyte 22 and the etching of surface 18 is commenced. A radiation source 29 is positioned beneath the container 31 so that radiation may impinge upon the surface 18 through the electrolyte 22 and window 32. This radiation is utilized to develop positive current carriers (holes) in the bulk material of the cell 11 on either side of the grain boundary 12. In the previous case where the material immediately adjacent and on the grain boundary 12 was etched away to form groove 26, the positive carriers (holes) were developed right at the grain boundary 12. Since a ridge 33 is now to be developed along the grain boundary 12 at surface 18, the greater production of positive charges must occur in the bulk material of the cell 11. This is accomplished by the application of the negative potential to the boundary 12. In other words, the positive carriers (holes) which are normally present in the boundary 12 are immediately combined with electrons due to the negative potential applied at the grain boundary 12. This results in a depletion of the concentration of holes on the grain boundary 12 and in the areas of the cell 11 which are immediately adjacent the grain boundary 12. In other words, the bulk material, due to the irradiating energy, now contains more holes or positive current carriers than the material immediately adjacent the grain boundary 12. The result of this is that the germanium farthest from the grain boundary 12 will be etched by the etchant 22 at a greater rate than the germanium immediately adjacent the grain boundary 12. The result is an etched surface which roughly corresponds to the dotted line 34 illustrated in FIGURE 2. It is particularly noted that as the etched surface 34 approaches the contact 36 or negative contact, the base of the ridge 33 is widened. The reason for this is that the holes in the bulk material are combining more rapidly near the contact 36 than they are farther along the grain boundary 12.

After a ridge 33 of suitable depth is etched in the surface 18 of the cell, the cell is removed from the etchant and may be neutralized by application of a number of neutralizing materials. The liquid contact may be removed from the groove 26 and the residual silver paint may be removed by simply applying organic solvents to the groove 26. Thus a cell which corresponds to that shown in FIGURE 4 is completed.

It is to be understood that although this process was described as it is carried out in connection with N-type germanium, the principles of the process may also be applied to other types of semiconductor material with a simple alteration of the electrolyte involved, the voltage polarities concerned, and the like. It is to be understood that the above embodiments are merely illustrative of the principles of the invention and many variations may be made by those skilled in the art without departing from the spirit and scope of the invention.

Now therefore I claim:

1. A process for etching a semiconductor cell along a grain boundary extending through the cell from a first surface to a second surface thereof, said cell including homogeneous, generally single crystalline material on opposite sides of said grain boundary, which comprises the steps of placing said second surface of said cell in contact with an electrolytic etching solution, applying a substantially constant electric potential across said first surface of said cell on each side of said grain boundary and said electrolytic solution so that an electric potential is maintained across said electrolytic solution and said second surface of said cell, and then irradiating said first surface to increase the generation of current carriers along said grain boundary to etch a groove in said cell along said grain boundary in contact with said electrolytic solution.

2. A process in accordance with claim 1 in which said cell is composed of an N-type semiconductor material and in which the potential applied to said first surface is a positive D.C. potential.

3. A process in accordance with claim 2 in which said electrolytic solution is a solution of a hydroxide taken from the group consisting of alkaline-earth-metal and alkali-metal hydroxides.

4. A process is accordance with claim 2 in which said electrolytic solution is a 10% solution of sodium hydroxide.

5. A process for etching a semiconductor cell along a grain boundary extending through the cell from a first surface to a second surface thereof, said cell including homogeneous, generally single crystalline material on opposite sides of said grain boundary, which comprises the steps of placing said second surface of said cell in contact with an electrolytic etching solution, applying a substantially constant positive potential to said first surface of said cell on opposite sides of said grain boundary and a substantially constant negative potential to said electrolytic solution so that an electric potential is maintained across said electrolytic solution and said second surface, irradiating said first surface to increase the generation of current carriers along said grain boundary to etch a groove in said cell along said grain boundary in contact with said electrolytic solution, removing said cell from said electrolytic solution, placing said first surface in contact with said electrolytic solution, applying said negative potential to said grain boundary at said second side, and then irradiating said first surface to effectuate etching of said first surface on either side of said grain boundary.

6. A process in accordance with claim 5 which further includes the step of filling said groove with a liquid conductor after the first surface is placed in contact with said electrolytic solution to facilitate application of said potential of reverse polarity to said grain boundary.

7. A process in accordance with claim 6 in which said liquid conductor is silver paint.

8. A process in accordance with claim 5 in which said cell is composed of N-type germanium, in which the potential applied to said first surface is a positive D.C. potential and in which said electrolytic solution is a solution of a hydroxide taken from the group consisting of alkaline earth metal and alkali-metal hyroxides.

9. A process for etching a semiconductor cell along a grain boundary extending through the cell from a first surface to a second surface thereof, said cell including homogeneous, generally single crystalline material on opposite sides of said grain boundary, which comprises the steps of placing said first surface in contact with an electrolyte, applying a D.C. potential across said first surface on opposite sides of said grain boundary and said electrolyte, applying a D.C. potential of opposite polarity from that applied to the electrolyte to said grain boundary at said second surface, and then irradiating said first surface to effectuate etching of said first surface on either side of said grain boundary.

References Cited by the Applicant

Bell System Technical Journal, vol. 34, pp. 129–76 (1955).

Journal of the Electrochemical Society, vol. 103, pp. 252–56 (1956).

Physical Review, vol. 94, p. 750 (1954).

JOHN H. MACK, *Primary Examiner.*

R. K. MIHALEK, *Assistant Examiner.*